(12) United States Patent
Shimada

(10) Patent No.: US 7,592,769 B2
(45) Date of Patent: Sep. 22, 2009

(54) ELECTRIC CYLINDER

(75) Inventor: Toshiaki Shimada, 2-41-2, Kawauchi, Asaminami-ku, Hiroshima-shi, Hiroshima 731-0102 (JP)

(73) Assignee: Toshiaki Shimada (JP)

( * ) Notice: Subject to any disclaimer, the term of this patent is extended or adjusted under 35 U.S.C. 154(b) by 589 days.

(21) Appl. No.: 10/567,690

(22) PCT Filed: Aug. 17, 2005

(86) PCT No.: PCT/JP2005/015012

§ 371 (c)(1),
(2), (4) Date: Feb. 9, 2006

(87) PCT Pub. No.: WO2006/040876

PCT Pub. Date: Apr. 20, 2006

(65) Prior Publication Data

US 2008/0148887 A1 Jun. 26, 2008

(30) Foreign Application Priority Data

Oct. 13, 2004 (JP) ............................. 2004-328233

(51) Int. Cl.
*G05B 11/32* (2006.01)

(52) U.S. Cl. .................. 318/625; 318/560; 74/89.23; 74/89.37; 74/89

(58) Field of Classification Search ................. 318/625, 318/560; 417/15, 24, 42, 214, 223; 74/89, 74/89.23, 89.37
See application file for complete search history.

(56) References Cited

U.S. PATENT DOCUMENTS 4,061,049 A 12/1977 Beurrier (Continued)

FOREIGN PATENT DOCUMENTS

DE 36 00 497 9/1986

(Continued)

OTHER PUBLICATIONS

International Search Report PCT/JP2005/015012 dated Nov. 22, 2005.
European Search Report Application No. EP 05 78 0372 dated on Dec. 19, 2007.

*Primary Examiner*—Bentsu Ro
*Assistant Examiner*—David S Luo
(74) *Attorney, Agent, or Firm*—Studebaker & Brackett PC; Donald R. Studebaker

(57) ABSTRACT

There are provided two kinds of nuts of a ball thread nut 20 and a non-ball thread nut 30 which is rotatable in synchronization with the ball thread nut 20 and in which a thread groove in rectangular or trapezoidal shape in section is formed. In a thread rod 10, two kinds of thread grooves are formed at the same pitch, one 11 of the thread grooves being in an arc shape in section so as to be meshed with the ball thread nut 20 through balls B and the other thread groove 12 being in a rectangular or trapezoidal shape in section so as to be meshed with the non-ball thread nut 30. When load is less than a predetermined value, the thread ridge of the non-ball thread nut 20 and the thread ridge 13 of the thread rod 10 are separated and are out of contact with each other so that the thread rod 10 is moved in the axial direction thereof by only the ball thread nut 20. In contrast, when the load exceeds the predetermined value, the thread ridge 31 of the non-ball thread nut 30 and the thread ridge 13 of the thread rod 10 are made in contact with each other so that the thread rod 10 is moved in the axial direction by the non-ball thread nut 30.

8 Claims, 9 Drawing Sheets

U.S. PATENT DOCUMENTS

| | | | |
|---|---|---|---|
| 4,730,503 A | | 3/1988 | Rosenthal |
| 5,092,753 A | * | 3/1992 | Kumamura et al. ......... 425/145 |
| 5,590,580 A | * | 1/1997 | Nagai ............................ 92/33 |
| 6,116,139 A | * | 9/2000 | Yuda et al. ..................... 91/61 |
| 6,244,122 B1 | * | 6/2001 | Hsu et al. .................. 74/89.23 |
| 6,807,877 B2 | * | 10/2004 | Sato et al. .................. 74/89.37 |
| 2001/0029797 A1 | * | 10/2001 | Lange et al. ............... 74/89.37 |
| 2005/0081660 A1 | * | 4/2005 | Migliori ........................ 74/25 |

FOREIGN PATENT DOCUMENTS

| | | | |
|---|---|---|---|
| EP | 0 251 884 | | 1/1988 |
| JP | 61-24872 | | 2/1986 |
| JP | 9-271154 | | 10/1997 |
| JP | 9-303516 | | 11/1997 |
| JP | 10-70864 | | 3/1998 |
| JP | 10 142520 | | 5/1998 |
| JP | 2002-227957 | * | 8/2002 |
| JP | 2002 227957 | | 8/2002 |

* cited by examiner

ELECTRIC CYLINDER

TECHNICAL FIELD

The present invention relates to an electric cylinder applied to a presser, for example, in which movements of the presser to a target point is swift under no load application or low load application and which copes with high load application to a thread rod.

BACKGROUND ART

Besides cylinders utilizing fluid pressure such as pneumatic cylinders and hydraulic cylinders, electric cylinders are widely used in which a thread rod or a nut meshed with the nut or the thread rod is moved in the axial direction thereof by the rotation of the other. The nut and the thread rod of such an electric cylinder compose a ball thread in combination with balls and an arc-shaped thread groove is formed in each of the nut and the thread rod. The plural balls are filled in a line of a threaded path formed by meshing the nut with the thread rod. The ball rolls and circulates therein in association with the rotation of either one of them. Ball threads of this kind are widely employed.

Rolling of the balls for moving the thread rod or the nut in the axial direction thereof causes friction, which is rather small compared with the sliding friction caused in general trapezoidal threads and square threads. Accordingly, it is widely known that the movement in the axial direction of the thread rod or the nut is smooth and that high speed operation can be easily attained with high accuracy.

In the case where large thrust is required, however, high load is applied to one of the thread rod and the nut to cause the balls to compress an extremely limited part of the groove wall, forming an indent in the groove. Accordingly, the thread rod or the nut encounters difficulty or impossibility of smooth movement in the axial direction. This means inapplicability to those applied for high load application. The use of a nut and a thread rod formed of a squire thread or a trapezoidal thread would cope with high load application. However, the travel speed thereof to a target point is low under no load application.

In contrast, the thread rod and the nut with increased diameters may cope with high load application. Also, there are proposed constitution in which the number of combinations of ball threads and nuts meshed therewith is increased for coping with high load application at low speed operation and no load application at high speed operation (Patent Documents 1 and 2, for example).

However, these proposals fall within the general bounds and provide no radial means for solving the aforementioned problems. Also, the diameters of the thread rod and the nut and/or the number of combinations of the ball threads and the nuts must be increased even for the movement to a target point under no load application. This is futile and invites an increase in size and production cost.

Patent Document 1: Japanese Patent Application Laid Open Publication No. 9-271154A ([Claims] and FIG. 1)

Patent Document 2: Japanese Patent Application Laid Open Publication No. 10-70864A ([Claims] and FIG. 1)

SUMMARY OF THE INVENTION

Problems that the Invention is to Solve

In view of the foregoing, the present invention has its object of providing a small-size and low-cost electric cylinder which is free from the above problems, in which movement to a target point is swift under no load application and low load application, and which copes with high load application to a thread rod.

Means of Solving the Problems

To attain the above object, an electric cylinder according to the first invention includes: two kinds of nuts of a ball thread nut in which a thread groove in an arc shape in section is formed and a non-ball thread nut which is rotatable in synchronization with the ball thread nut and in which a thread groove in a rectangular or trapezoidal shape in section is formed; and a thread rod inserted through the two kinds of nuts, wherein in the thread rod is a double-start thread in which the two kinds of thread grooves are formed at the same pitch, the thread grooves including a thread groove in an arc shape in section meshed with the ball thread nut through balls and a thread groove in a rectangular or trapezoidal shape in section meshed with the non-ball thread nut, and the electric cylinder is so composed that: when load working in the axial direction on the thread rod is less than a predetermined value, a thread ridge of the non-ball thread nut and a thread ridge of the thread rod are separated and are out of contact with each other so that the thread rod is moved in the axial direction thereof by only the ball thread nut, and when the load working in the axial direction on the thread rod exceeds the predetermined value, the thread ridge of the non-ball thread nut and the thread ridge of the thread rod are made in contact with each other so that the thread rod is moved in the axial direction thereof by the non-ball thread nut.

The second invention is the same as the first invention except that a single-start thread is provided as the thread rod which includes a ball thread portion in which only a thread groove in an arc shape in section meshed with the ball thread nut through balls is formed and a non-ball thread portion in which only a thread groove in a rectangular or trapezoidal shape in section meshed with the non-ball thread portion is formed, the ball thread portion and the non-ball thread portion being formed separately in the axial direction.

The third invention is the same as the first invention except that a plurality of thread rods are provided in parallel to each other, wherein only a thread groove in an arc shape in section meshed with the ball thread nut through balls is formed in each of some of the plural thread rods while only a thread groove in a rectangular or trapezoidal shape in section meshed with the non-ball thread nut is formed in each of the other thread rod.

In the fourth invention, in addition to the constitution in any one of the first to third inventions, a width of the thread ridge of the non-ball thread nut is set smaller than a width of the thread groove for the non-ball thread nut of each thread rod so that a state is controllable and exchangeable between a state that the thread ridge of the non-ball thread nut is separated from the thread ridge of each thread rod and a state that they are in contact with each other.

In addition to the constitution in the fourth invention, the fifth invention is provided with a mating clutch for connecting the ball thread nut and the non-ball thread nut so that the ball thread nut is moved in the axial direction with respect to the non-ball thread nut while one of the ball thread nut and the non-ball thread nut rotates in synchronization with rotation of the other.

In addition to the constitution of the fourth invention, the sixth invention is provided with a servo mechanism for controlling and exchanging the state between the state that the thread ridge of the non-ball thread nut is separated from the thread ridge of each thread rod and the state that they are in contact with each other, the servo mechanism including: a main servo motor for rotating the ball thread nut; a sub-servo motor for rotating the non-ball thread nut; a servo amplifier for performing speed control with respect to the main servo motor that rotates the ball thread nut; and another servo amplifier which receives a signal from the main servo motor to allow the sub-servo motor to follow the main servo motor and which performs position control so that the sub-servo motor is displaced with respect to the main servo motor according to load of the main servo motor and so that the displacement of the sub-servo motor with respect to the main servo motor is withdrawn according to the load of the sub servo motor.

In the seventh invention, in addition to any one of the fourth to sixth inventions, the ball thread nut is supported to a main body by means of a sleeve urged in the axial direction by a spring movably in the axial direction together with each thread rod according to load in the axial direction working on the ball thread nut, and the non-ball thread nut is supported and fixed in the axial direction to the main body so that the thread ridge of the non-ball thread nut is separated from or in contact with the thread ridge in a rectangular or trapezoidal shape in section of the corresponding thread rod by movement in the axial direction of each thread rod.

EFFECTS OF THE INVENTION

According to the first to third inventions, the one thread rod meshed with the nuts can move in the axial direction at high speed by only the ball thread nut capable of high speed rotation under no load application or low load application and at low speed under high load application with the non-ball thread nut receiving the load. This enables reduction in cylinder size and production cost. Further, with no need for unnecessarily increasing the diameters of the thread rod and the nut or the number of the thread rods and the nuts, the thread rod can cope with load working on the thread rod in the axial.

In the fourth invention, the width of the thread ridge of the non-ball thread nut is set smaller than the width of the thread groove for the non-ball thread of the thread rod, so that separation and contact between the ridge of the non-ball thread nut and the thread ridge of the thread rod can be controlled easily.

According to the fifth invention, in addition to the effect of the fourth invention, a further effect that both the nuts can be rotated always synchronously with a simple construction by a single motor can be obtained, resulting in low production cost.

In the sixth invention, the servo mechanism is provided, inviting compilation. However, an effect that separation and contact between the ridge of the non-ball thread nut and the ridge of the thread rod can be controlled further easily and reliably can be obtained besides the effect of the fourth invention.

The seventh invention attains an effect that separation and contact between the ridge of the non-ball thread nut and the ridge of the thread rod can be controlled easily even with a simple construction and at low production cost, in addition to the effect of the fifth invention.

BRIEF DESCRIPTION OF THE DRAWINGS

FIG. 61 is a section showing the fifth example of the electric cylinder according to the present invention.

Figure 1:
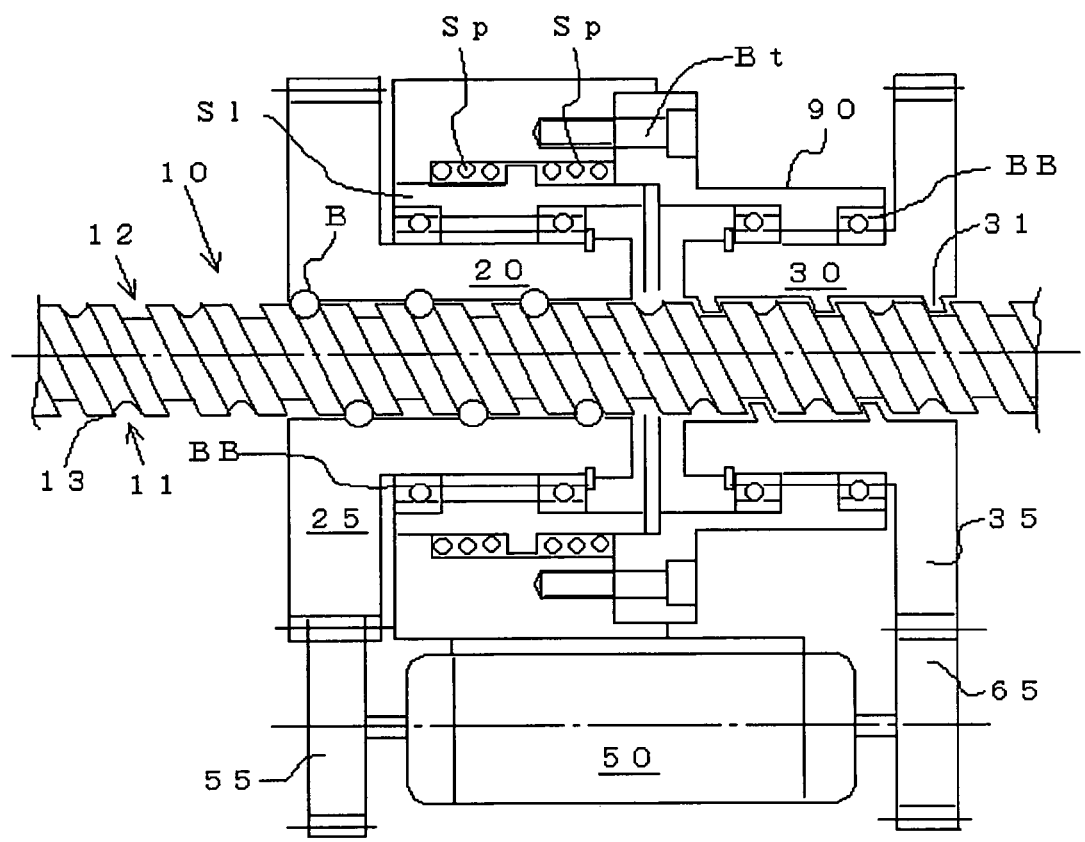
FIG. 1 is a section showing the first example of an electric cylinder according to the present invention.

EXPLANATION OF REFERENCE NUMERALS 10 thread rod
11 thread groove
12 thread groove
13 thread ridge
20 ball thread nut
25 gear
30 non-ball thread nut
31 thread ridge
35 gear
50 motor
51 servo motor
55 gear
56 servo amplifier
61 servo motor
65 gear
66 servo amplifier
90 main body
120 ball thread nut
125 gear
130 non-ball thread nut
131 thread ridge
150 motor
155 gear
220 ball thread nut
230 non-ball thread nut
231 thread ridge
250 motor
290 main body
310 thread rod
311 thread groove
312 thread groove
313 thread ridge
320 ball thread nut
325 gear
330 non-ball thread nut
331 thread ridge
335 gear
351 serve motor
355 gear
356 servo amplifier
361 servo motor
365 gear
366 servo amplifier
390 main body 410 thread rod
411 thread groove
490 main body
510 thread rod
512 thread groove
513 thread ridge
B ball
BB ball bearing
BS ball thread portion
Bt bolt
C mating clutch
CB coupling member
EC encoder
F flange
NBS non-ball thread portion
R rod body
Sl sleeve
Sp spring

BEST MODE FOR CARRYING OUT THE INVENTION

The embodiments of the present invention will be described below with reference to the accompanying drawings. It is noted that the following description of the preferred embodiments is mere examples substantially and is not intended to limit the scope of the present invention, and applicable subjects, and the use thereof.

In an electric cylinder according to the present invention, a thread rod meshed with nuts moves in the axial direction thereof by rotation of either of the nuts. The various aspects thereof may be considered, wherein the basic constitution is as follow in sum.

(1) There are provided a ball thread nut in which a thread groove in an arc-shape in section is formed and a non-ball thread nut which is rotatable in synchronization with the ball thread nut and in which a thread groove in a rectangular or trapezoidal shape in section is formed.

(2) The width of the thread ridge of the non-ball thread nut is set smaller than the width of the thread groove in a rectangular or trapezoidal shape in section of the thread rod so that:

when load working in the axial direction on the thread rod is less than a predetermined value, the thread ridge of the non-ball thread nut and the thread ridge of the thread rod are separated from each other and are out of contact with each other so that the thread rod is moved in the axial direction thereof by only the ball thread nut of the synchronously rotating nuts, and when the load working in the axial direction on the thread rod exceeds the predetermined value, the thread ridge of the non-ball thread nut and the thread ridge of the thread rod are made in contact with each so that the thread rod is moved in the axial direction thereof by the non-ball thread nut of the synchronously rotating nuts.

The thread rod meshed with the ball thread nut and the non-ball thread nut may include the following three types. Namely:

(a) A double-start thread rod in which two kinds of thread grooves are formed at the same pitch, one of the thread grooves being in an arc shape in section and being meshed with the ball thread nut and the other thread groove being in a rectangular or trapezoidal shape in section and being meshed with the non-ball thread nut.

(b) A single-start thread rod including separately in the axial direction thereof one ball thread portion in which a thread groove in an arc shape in section is formed and one non-ball thread portion in which a thread groove in a rectangular or trapezoidal shape in section is formed, the ball thread portion being meshed with the ball thread nut and the non-ball thread portion being meshed with the non-ball thread nut.

(c) A plurality of thread rods are provided in parallel, in some of which only a thread groove in arc shape in section meshed with the ball thread nut is formed and in the other of which only a thread groove in a rectangular or trapezoidal shape in section meshed with the non-ball thread nut is formed.

Figure 2:
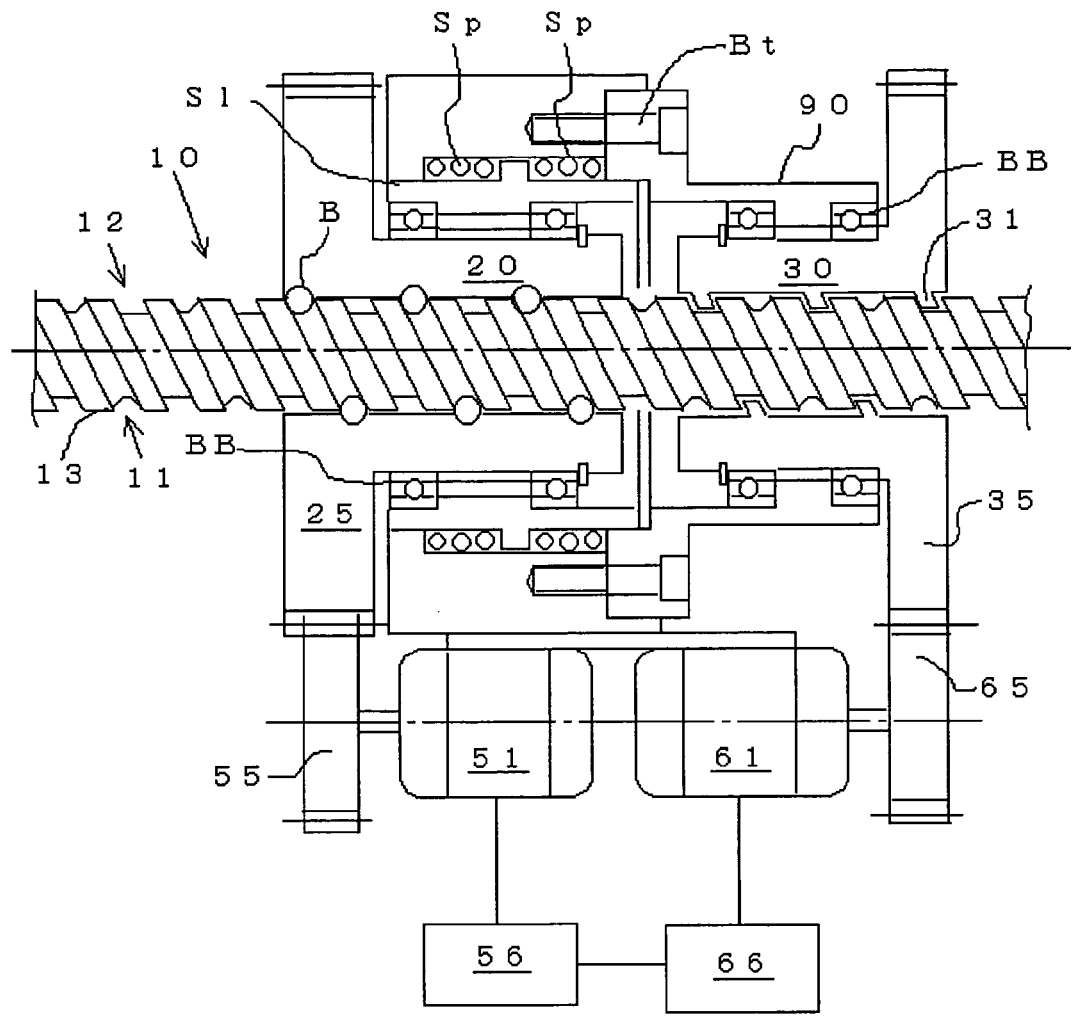
FIG. 2 is a section showing the second example of the electric cylinder according to the present invention.

The respective types will be described next in the above order. FIG. 1 and FIG. 2 show the best modes thereof. Referring to the common elements in FIG. 1 and FIG. 2, reference numeral 10 denotes a thread rod in which two kinds of thread grooves of a thread groove 11 in an arc shape in section and a thread groove 12 in a rectangular or trapezoidal shape in section are formed at the same pitch. Reference numerals 20 and 30 denote a ball thread nut and a non-ball thread nut, respectively, which are meshed with the thread rod 10, wherein a thread groove in an arc shape in section and a thread groove in a rectangular or trapezoidal shape in section (reference numerals are omitted for both of them) are formed in the respective inner face portions thereof and gears 25, 35 are arranged coaxially at respective one ends of the nuts. Reference numerals 55, 65 denote gears respectively meshed with the gears 25, 35. B denotes each ball filled in a thread path (reference numeral is omitted) formed in combination of the ball thread nut 20 and the thread rod 10 meshed therewith.

Referring to the relationship between the non-ball thread nut 30 and the thread rod 10, the width of the thread ridge 31 of the non-ball thread nut 30 is set smaller than the width of the thread groove 12 in a rectangular or trapezoidal shape of the thread rod 10. When the thread rod 10 meshed with the non-ball thread nut 30 is displaced in the axial direction or is rotated around the axis with the non-ball thread nut 30 fixed in the axial direction, the thread ridge 31 of the non-ball thread nut 30 and the thread ridge 13 of the thread rod 10 are made separated from or in contact with each other.

The ball thread nut 20 and the non-ball thread nut 30 are rotatably and coaxially supported to a main body 90 by means of a ball bearings BB, and the main body 90 is composed of a portion on the ball thread nut 20 side and a portion on the non-ball thread nut 30 side, which are connected with each other by means of a bolt Bt.

Reference numeral Sl is a sleeve fitted between the outer face of the ball thread nut 20 and the main body 90 and pressed by springs Sp, Sp against the main body 90 slightly movably in the axial direction of the thread rod 10. The sleeve Sl receives the pressure of the springs Sp, Sp from both sides in the axial direction under no load working on the thread rod 10, thereby being positioned so that the thread ridge 13 of the thread rod 10 and the thread ridge 31 of the non-ball thread nut 30 are out of contact with each other, as described above (for example, so that the thread ridge 31 of the non-ball thread nut 30 is located at the center of the thread groove 12).

Further, the length and the strength of the springs Sp, Sp are set so that the thread rod 10 moves against the pressure of one of the springs Sp, Sp when the load exceeds a predetermined value to allow the thread ridge 31 of the non-ball thread nut 30 and the thread ridge 13 of the thread rod 10 to be in contact with each other.

Figure 3:
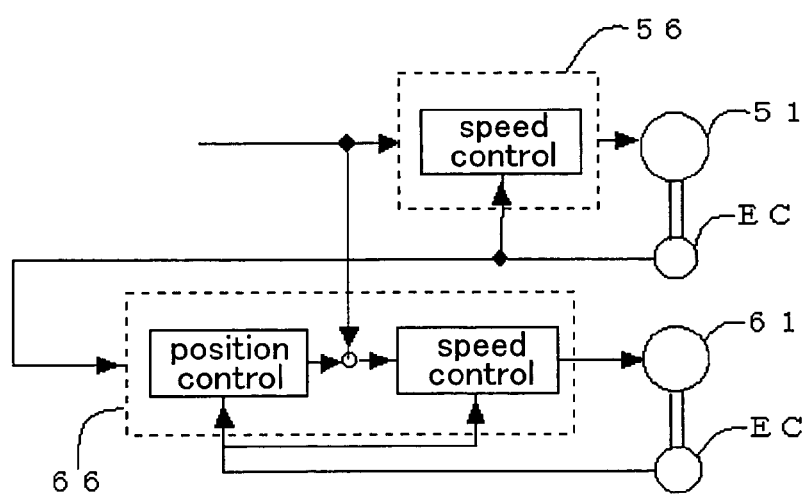
FIG. 3 is a system diagram of a servo mechanism employed in FIG. 2

In FIG. 1, one motor 50 rotates the ball thread nut 20 and the non-ball thread nut 30 in synchronization with each other through the two pairs of gears connected in series on the respective sides and meshed with each other. In contrast, in FIG. 2, two servo motors 51, 61 are provided for separately rotating the nuts 20, 30. While, as shown in FIG. 3, there is provided a servo mechanism, as will be described later, which includes a servo amplifier 56 for performing only speed control to the servo motor 51 that rotates the ball thread nut 20 and a servo amplifier 66 for performing position control to the servo motor 61 that rotates the non-ball thread nut 30. The reference EC denotes an encoder.

Operation in the first example shown in FIG. 1 will be described first. The motor 50 starts driving to synchronously rotate the ball thread nut 20 and the non-ball thread nut 30. At this time point, no load works in the axial direction on the thread rod 10 and the thread ridge 13 of the thread rod 10 and the thread ridge 31 of the non-ball thread nut 30 are separated from each other, as described above. Accordingly, the thread rod 10 is rotated by only the rotation of the ball thread nut 20 with no contribution of the non-ball thread nut 30 to the movement of the thread rod 10. The ball thread nut 20 is rotatable at high speed, allowing the thread rod 10 to reach a target point swiftly.

Then, before the thread rod 10 reaches the target point and load in the axial direction works on the thread rod 10, the rotation speed of the motor 50 is decreased so that the thread rod 10 can cope with the load to be applied. Further, according to an increase in load, the thread rod 10 pushes one of the springs Sp, Sp together with the ball thread nut 20 and the sleeve Sl to move in the direction for contracting the spring Sp.

Further, when the load exceeds a predetermined value, the thread ridge 13 of the thread rod 10 becomes in contact with the thread ridge 31 of the non-ball thread nut 30, as described above, so that the thread rod 10 moves in the axial direction by (the rotation of) the non-ball thread nut 30 in place of the ball thread 20 to perform work corresponding to the load. Thus, the compressing force of the springs Sp suppresses the pressure of the balls B against the ball thread nut 20 and the arc-shaped thread groove 11 of the thread rod 10, thereby preventing them from being damaged.

Operation in the second example shown in FIG. 2 and FIG. 3 will be described next. While the thread ridge 13 of the thread rod 10 and the thread ridge 31 of the non-ball thread nut 30 are made in contact with or separated from each other by only contraction or expansion of either of the springs Sp, Sp in association with the change in load in the axial direction to the thread rod 10 in the aforementioned first example, the contact and the separation therebetween are carried out in the following manner in the second example.

Namely, when the main servo motor 51 starts driving, the sub-servo motor 61 follows on the basis of position instruction signals therefrom to rotate synchronously. In association therewith, the ball thread nut 20 and the non-ball thread nut 30 rotate synchronously. Each state of the rotating nuts at this time point is the same as in the first example, namely, the thread ridge 13 of the thread rod 10 and the thread ridge 31 of the non-ball thread nut 30 are separated from each other and the thread rod 10 is rotated only by the rotation of the ball thread nut 20 with no contribution of the non-ball thread nut 30 to the movement in the axial direction of the thread rod 10. As well as the first example, the ball thread nut 20 is rotatable at high speed, allowing the thread rod 10 to reach a target point swiftly. The aforementioned instruction signals are sent from the servo amplifiers 56, 66.

Subsequently, before the thread rod 10 reaches the target point and load in the axial direction works on the thread rod 10, the rotation speed of the motor 50 is decreased so that the thread rod 10 can cope with the load to be applied, similarly to the first example. When the load exceeds a predetermined value, the servo amplifier 56 senses an increase in load of the servo motor 51 by detecting the electric current and sends a signal for biasing a position instruction to the servo amplifier 66. The servo amplifier 66 performs the following position control to the sub-servo motor 61.

Namely, a pulse set at every predetermined time (140 µs, for example) is added to the sub-servo motor 61 to rotate (displace) the non-ball thread nut 30 by a predetermined angle around the axis of the ball thread nut 20 so that the gap between the thread ridge 31 of the non-ball thread nut 30 and the thread ridge 13 of the thread rod 10 is narrowed and the thread ridge 31 of the non-ball thread nut 30 and the thread ridge 13 of the thread rod 10 are in contact with each other. Furthermore, the displacement pushes back the thread rod 10 compressing the spring Sp in reverse to the direction in which the load works, so that the ball thread nut 20 that has moved in the axial direction returns to the original position.

In association therewith, the non-ball thread nut 30, in place of the ball thread nut 20, can move the thread rod 10 in the axial direction by its own rotation. Accordingly, even in the state that high load works in axial direction on the thread rod 10, the compressing force of the spring Sp suppresses the pressure of the balls B against the ball thread nut 20 and the arc-shaped thread groove 11 of the thread rod 10, preventing them from being damaged, similar to the first example.

In reverse, the sub-servo amplifier 66 senses by detecting an electric current indicating the load of the sub-servo motor 61 that the load is less than the predetermined value, sends a signal for biasing a position instruction, and subtracts the pulse set at every predetermined time (140 µs, for example) from the sub-servo motor 61 to return the non-ball thread nut 30 to the original position. The springs Sp, Sp contract or expand according to the load, similarly to those in the first example, to move the ball thread nut 20 in the axial direction. Further, the springs Sp, Sp are used for positioning the thread ridge 13 of the thread rod 10 and the thread ridge 31 of the non-ball thread nut 30 so as to allow them to be out of contact with each other when no load in the axial direction works on the thread rod 10.

Figure 4:
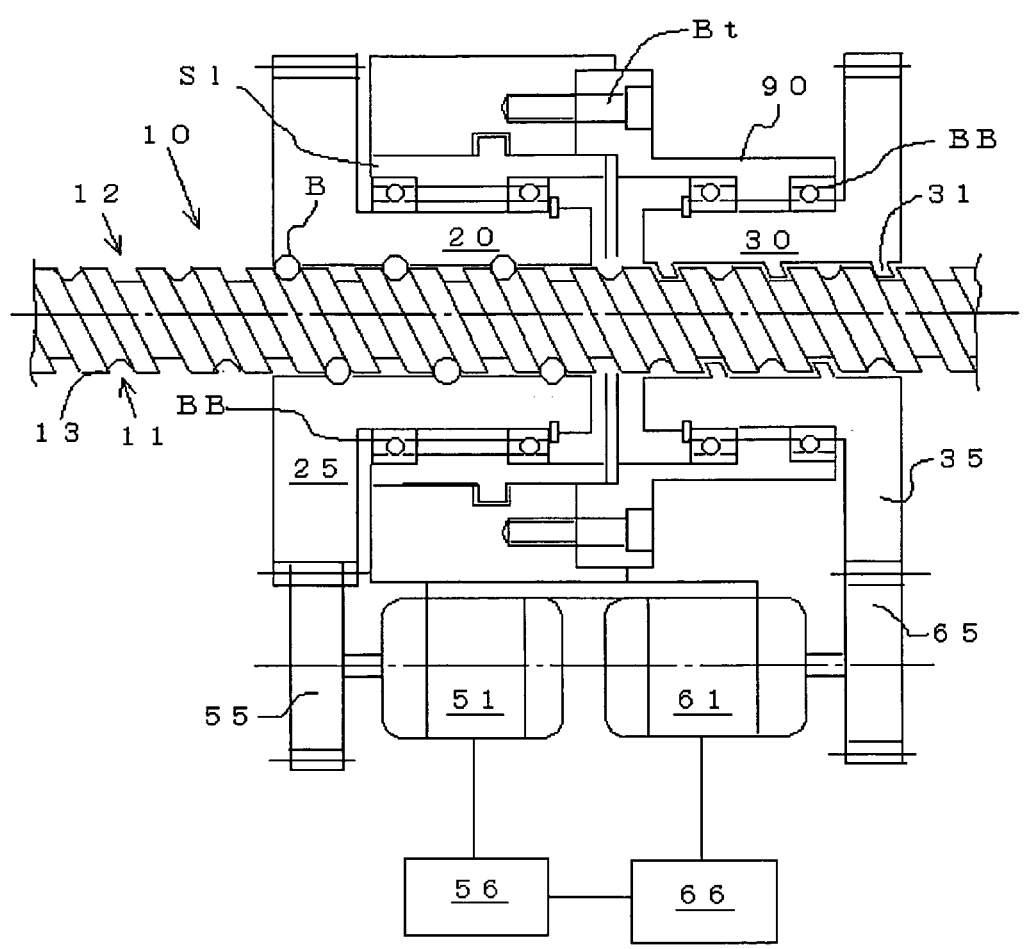
FIG. 4 is a section showing the third example of the electric cylinder according to the present invention.

The third example will be described with reference to FIG. 4. While the ball thread nut 20 is movable by the sleeve Sl in the axial direction with respect to the main body in the second example, the ball thread nut 20 is fixed immovably in the axial direction in the third example. Specifically, in the case where the thread ridge 31 of the non-ball thread nut 30 is set to be out of contact with the thread ridge 13 in a rectangular or trapezoidal shape in section of the thread rod 10 in the assembly stage, the servo mechanism rotates the non-ball thread nut 30 around the axis to allow them to be in contact with each other when the load working in the axial direction on the thread rod 10 exceeds a predetermined value, similarly to the second example, so that the thread rod 10 is moved in the axial direction by the rotation of the non-ball thread nut 30, similarly to the second example. The other operation in the third example is the same as that in the second example.

Figure 5:
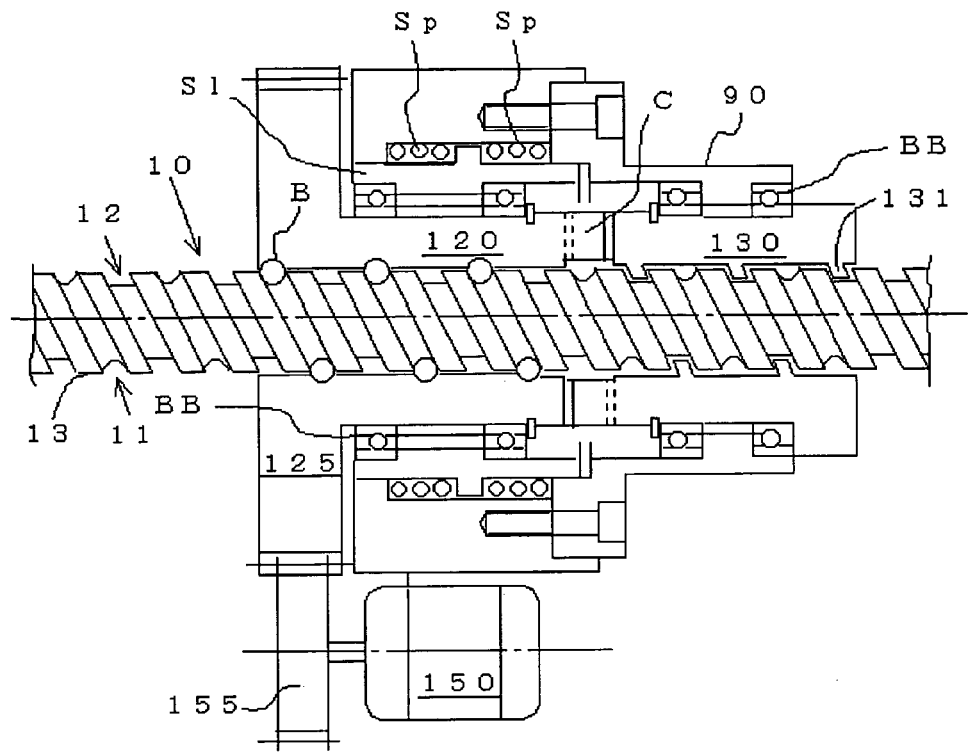
FIG. 5 is a section showing the fourth example of the electric cylinder according to the present invention.
Figure 6:
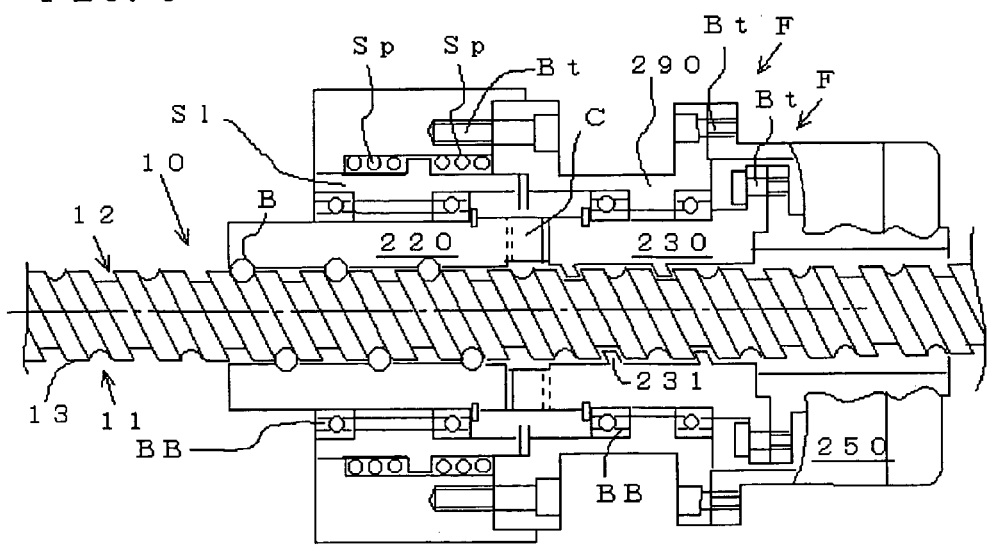
Figure 7:
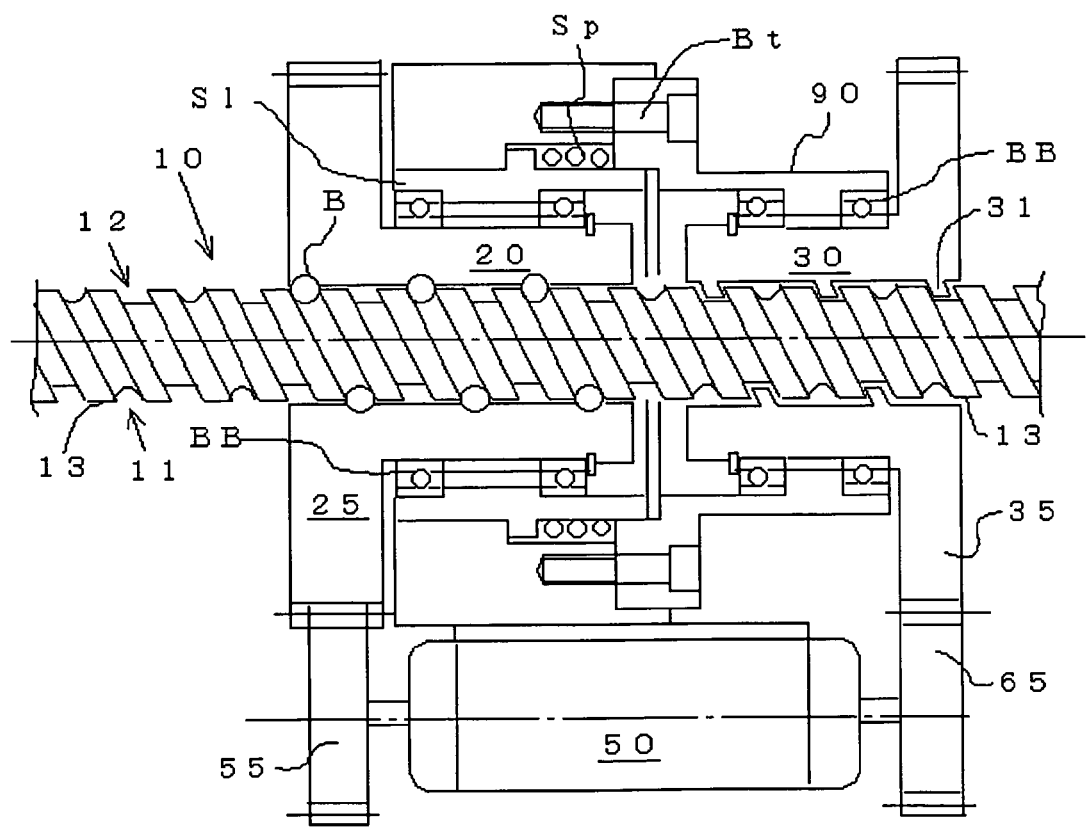
FIG. 7 is a section showing the sixth example of the electric cylinder according to the present invention.
Figure 8:
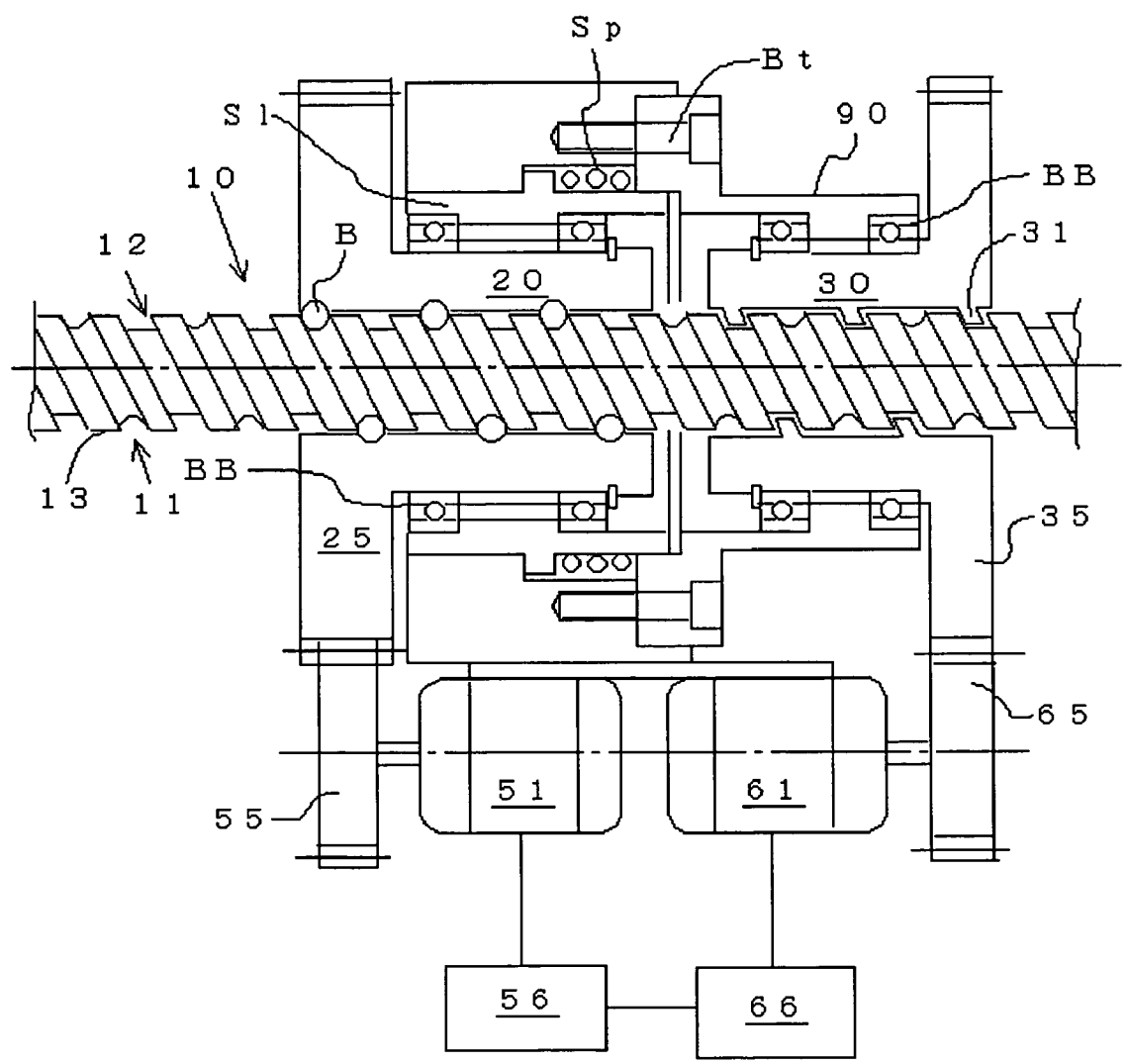
FIG. 8 is a section showing the seventh example of the electric cylinder according to the present invention.
Figure 9:
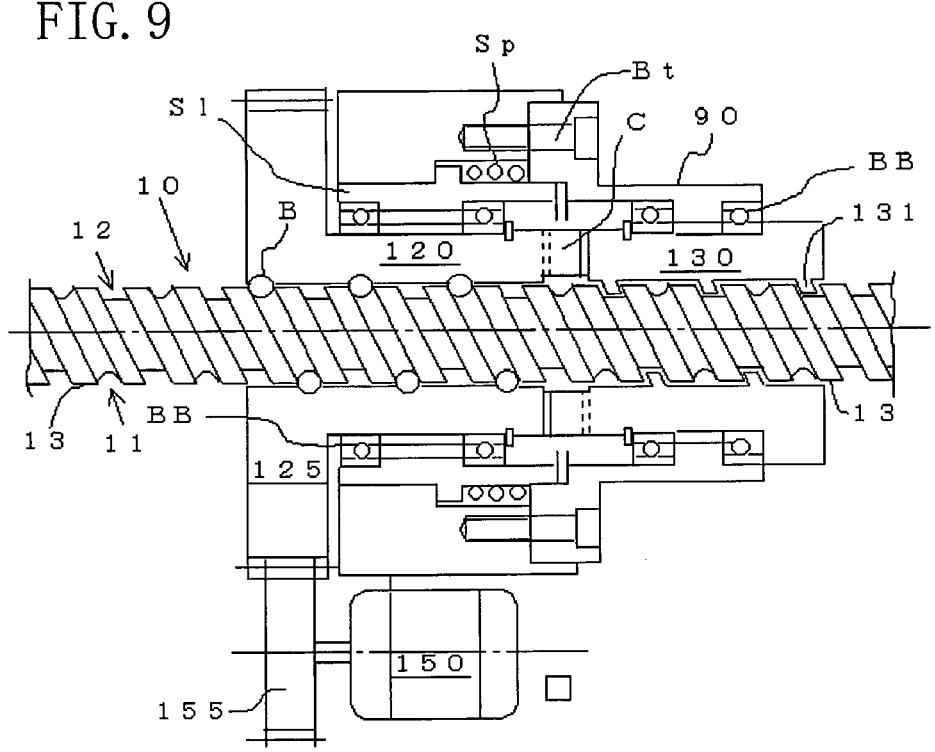
FIG. 9 is a section showing the eighth example of the electric cylinder according to the present invention.
Figure 10:
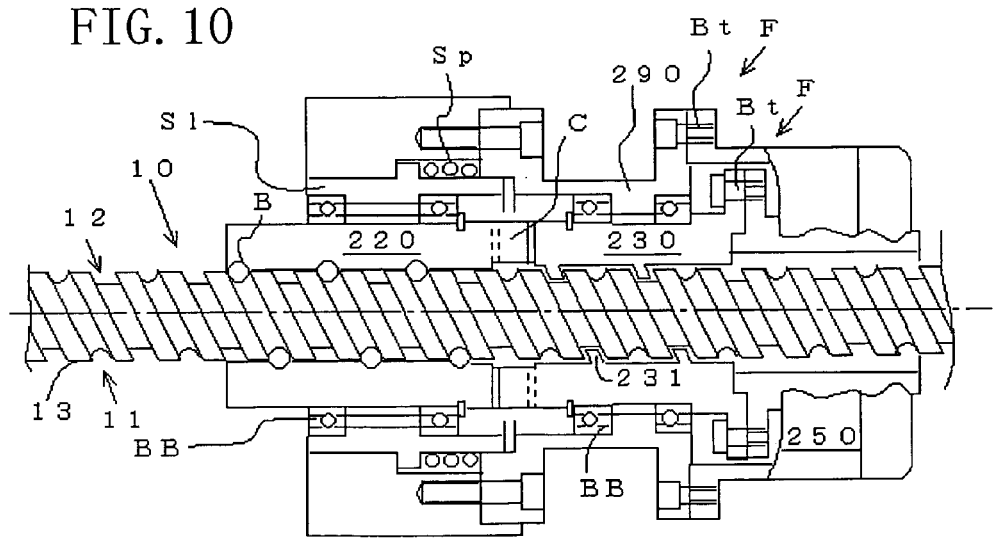
FIG. 10 is a section showing the ninth example of the electric cylinder according to the present invention.

The fourth and fifth examples will be described with reference to FIG. 5 and FIG. 6. Similarly to the first example, the examples are provided with the sleeve Sl and the springs Sp and one of the nuts is slightly movable in the axial direction with respect to the other nut. Further, the nuts are connected by means of a mating clutch C so that one of nuts 120, 220 is rotated by one motor 150, 250 to allow the other nut 130, 230 to be rotated always synchronously even when the one nut moves.

In addition to the above constitution, gears 125, 155 are interposed between the ball thread nut 120 and the motor 150 in the fourth example. While in the fifth example, the non-ball thread nut 130 is connected coaxially with the motor 250 by means of a flange F so as to eliminate the need to provide the gears for power transmission. The motor 250 in the fourth example forms a hollow through which the thread rod 10 passes and is fixed to the main body 290 by means of the flange F. The other elements such as the thread rod 10 are the same as those in the first and second examples.

Referring to operation in the fourth example, the motor 150 starts driving to synchronously rotate the ball thread nut 120 and the non-ball thread nut 130 connected thereto by means of the mating clutch C. At this time point, similarly to the first to third examples, the load working in the axial direction on the thread rod 10 is small and the thread ridge 13 of the thread rod 10 and the thread ridge 131 of the non-ball thread nut 130 are separated from each other, as described above. Accordingly, the thread rod 10 moves by only the rotation of the ball thread nut 120 with no contribution of the non-ball thread nut 130 to the movement in the axial direction of the thread rod 10. The ball thread nut 120 is rotatable at high speed, allowing the thread rod 10 to reach a target point swiftly.

Subsequently, before the thread rod 10 reaches the target point and load in the axial direction working on the thread rod 10 increases, the rotation speed of the motor 150 is decreased so that the thread rod 10 can cope with the load to be applied. Similarly to the first example, the thread rod 10 pushes the ball thread nut 120, the sleeve Sl, and one of the springs Sp, Sp according to the increase in load to move in the direction for contracting the spring Sp.

Accordingly, when the load exceeds a predetermined value, the thread ridge 13 of the thread rod 10 is in contact with the thread ridge 31 of the non-ball thread nut 130, so that the thread rod 10 is moved in the axial direction by (the rotation of) the non-ball thread nut 30 in place of the ball thread nut 20. Thus, the compressing force of the spring Sp suppresses the pressure of the balls B against the ball thread nut 120 and the thread groove 11 for the ball thread portion of the thread rod 10, preventing them from being damaged.

Operation in the fifth example is the same as that in the fourth example. The motor 250 starts driving to synchronously rotate the non-ball thread nut 230 and the ball thread nut 220 connected thereto by means of the mating clutch C. At this time point, the thread rod 10 is rotated and is moved by only the rotation of the ball thread nut 220, similarly to the fourth example. As well, the ball thread nut 220 is rotatable at high speed, allowing the thread rod 10 to reach a target point swiftly.

Next, similarly to the fourth example, before the thread rod 10 reaches the target point and load working in the axial direction on the thread rod 10 increases, the rotation speed of the motor 250 is decreased so that the thread rod 10 can cope with the load to be applied. Further, the thread rod 10 pushes the ball thread nut 220, the sleeve Sl, and one of the springs Sp, Sp according to the increase in load to move in the direction for contracting the spring Sp.

Accordingly, when the load exceeds a predetermined value, the thread ridge 13 of the thread rod 10 is in contact with the thread ridge 231 of the non-ball thread nut 230, so that the thread rod 10 is moved in the axial direction by (the rotation of) the non-ball thread nut 230 in place of the ball thread nut 220. Thus, the ball thread nut 220 and the thread groove 11 for the ball thread portion of the thread rod 10 are prevented from being damaged even under high load application, similarly to the fourth example.

In the sixth to ninth examples, as shown in FIG. 7 to FIG. 10, respectively, only one spring Sp is provided rather than the springs Sp, Sp in the first, second, fourth, and fifth examples, and the form of the sleeve Sl is changed accordingly. The respective other elements are the same as those in the first, second, fourth, and fifth examples. Therefore, operations in the respective examples are basically the same as those in the first, second, fourth, and fifth examples.

Referring to operation different from those in the first, second, fourth, and fifth examples, the thread rod 10 is movable bidirectionally in the axial direction according to load to be applied in the first, second, fourth, and fifth examples while the thread rod 10 in the sixth to ninth examples is movable against only load from the left in the drawings. This involves no problems substantially.

Figure 11:
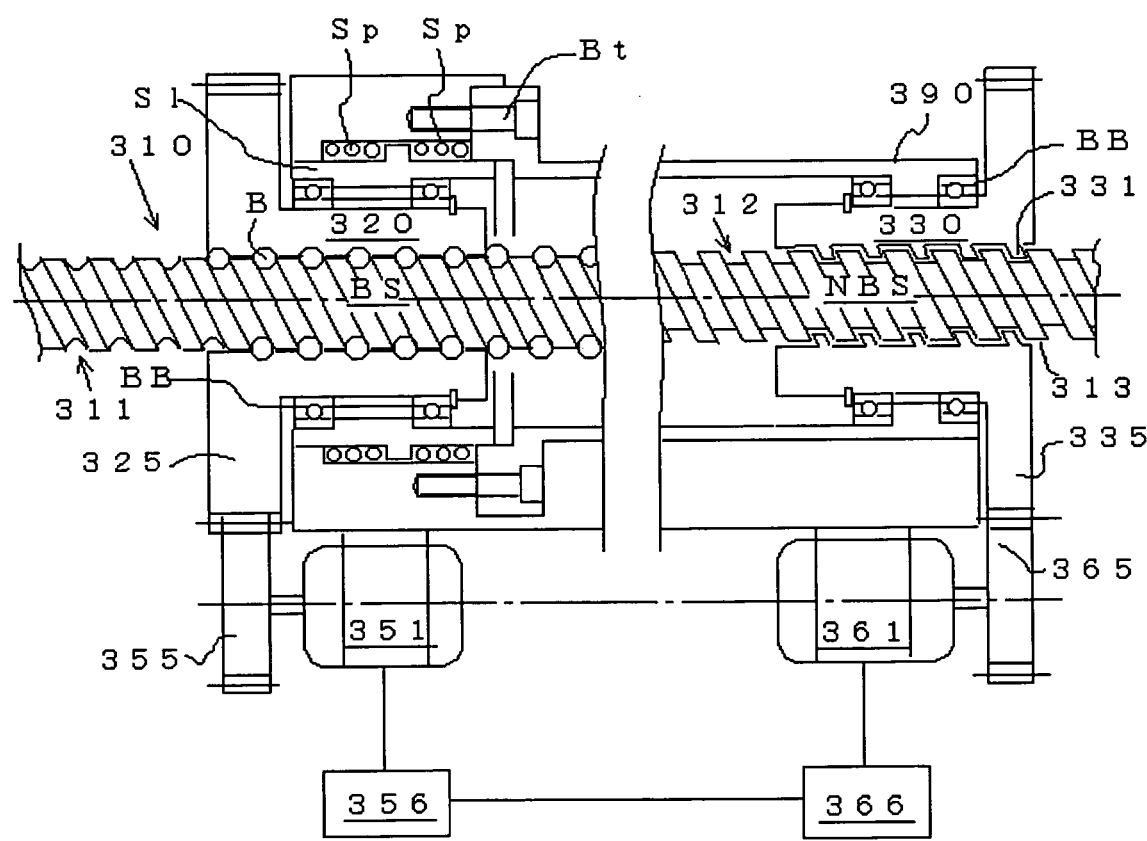
FIG. 11 is a section showing the tenth example of the electric cylinder according to the present invention.

The tenth example will be described with reference to FIG. 11. The thread rod 310 having a construction different from the thread rod 10 in the second example is provided and a main body 390 is extended accordingly in contrast to the main body 90 in the second example. The other elements are basically the same as those in the second example, through different reference numerals are allotted to some elements.

The thread rod 310 is a single-start thread including a ball thread portion BS and a non-ball thread portion NBS which are formed separately in the axial direction. In the ball thread portion BS, only a thread groove 311 in an arc shape in section is formed to be meshed with the ball thread nut 320 through the balls B. On the other hand, only a thread groove 321 in a rectangular or trapezoidal shape in section is formed in the non-ball thread portion NBS to be meshed with the non-ball thread nut 330.

The width of the thread ridge 331 of the non-ball thread nut 330 is set smaller than the width of the thread groove 312 in a rectangular or trapezoidal shape in section of the thread rod 10, so that the thread ridge 331 of the non-ball thread nut 330 and the thread ridge 313 of the thread rod 310 are made in contact with or separated from each other by the rotation of the thread rod 310 meshed with the non-ball thread nut 330 around the axis, basically similarly to the second example.

Wherein, the ball thread portion BS and the non-ball thread portion NBS of the thread rod 310 is movable in the axial direction only by the ball thread nut 320 or the non-ball thread nut 330. In the case where the travel distance in the axial direction of the thread rod 10 is the same as that of the thread rod 10 employed in the first to ninth examples, each thread portion BS, NBS require to have the same length as the thread rod 10 in the first to ninth examples. This requires the distance between the ball thread nut 320 and the non-ball thread nut 330 to be equal to or larger than the travel distance of the thread rod 310, resulting in elongation of the main body 390. The operation is basically the same as that in the second example, though.

The thread grooves 311, 312 are separated from each other in the thread rod 310 as a single-start thread in contrast to the thread rod 10 in the second example, thereby minimizing the lead and increasing the level of the load which the thread rod 310 can cope with.

Figure 12:
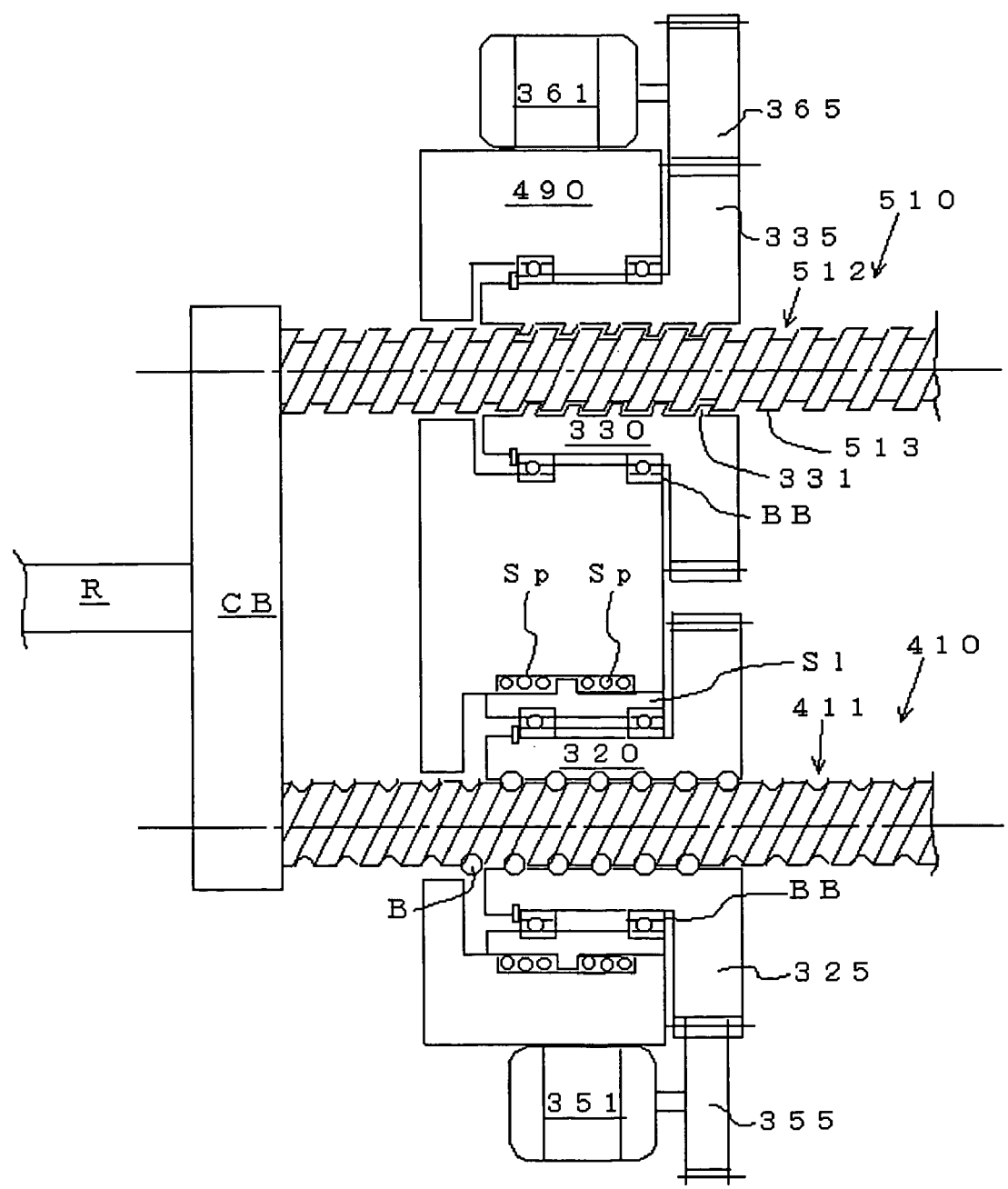
FIG. 12 is a section showing the eleventh example of the electric cylinder according to the present invention.

The eleventh example will be described with reference to FIG. 12. In this example, a plurality (two in the drawing) of different kinds of thread rods 410, 510 are arranged in parallel to each other. Specifically, only a thread groove 411 in an arc shape in section is formed in some thread rod 410 of the plural thread rods so as to be meshed with the ball thread nut 320 through the balls B similar to that in the ninth example, while a thread groove 512 in a rectangular or trapezoidal shape in section is formed in the other thread rod 510 so as to be meshed with the non-ball thread nut 330 similar to that in the ninth example. It is noted that: the thread rods are asymmetric in the case where only the two thread rods 410, 510 are provided; and therefore, in order to avoid the asymmetry, it is preferable, though not shown, to symmetrically arrange two thread rods 510, 510 and servo motors with one thread rod 410 interposed therebetween.

Further, a coupling member CB perpendicular to the plural thread rods 410, 510 is connected to each one end of the thread rods 410, 510 integrally therewith and movably in the parallel direction thereto, and a bar body R that receives the load directly is provided to the coupling member CB on the side opposite the thread rods 410, 510. The other elements in the eleventh example are substantially the same as those in the tenth example though different reference numerals are allotted to some elements.

The width of the thread ridge 331 of the non-ball thread nut 330 is set smaller than the width of the thread groove 512 in a rectangular or trapezoidal shape in section of the thread rod 510. Accordingly, the rotation of the thread rod 510 meshed with the non-ball thread nut 330 around the axis enables the thread ridge 331 of the non-ball thread nut 330 and the thread ridge 513 of the thread rod 510 to be in contact with or separated from each other, which is substantially the same as the tenth example. The servo amplifiers are not shown.

Though the form of the main body 490 must be changed according to the foregoing, the disadvantage of the elongation of the thread rod 310 can be improved in addition to the effects in the tenth example obtained. The combination of the thread rods 410, 510 is applicable to any of the first to ninth examples with no substantial change in operation necessitated.

INDUSTRIAL APPLICABILITY

As described above, the electric cylinder according to the present invention can be used in pressing apparatuses, for example.

The invention claimed is:

1. An electric cylinder comprising:
a first thread nut and a second thread nut, the first thread nut being a ball thread nut in which a thread groove in an arc shape in section is formed, and second thread nut being a non-ball thread nut which is rotatable in synchronization with the ball thread nut and in which a thread groove in a rectangular or trapezoidal shape in section is formed; and
a thread rod inserted through the first and second thread nut,
wherein in the thread rod is a double-start thread in which the two kinds of thread grooves are formed at the same pitch, the thread grooves including a thread groove in an arc shape in section meshed with the ball thread nut through balls and a thread groove in a rectangular or trapezoidal shape in section meshed with the non-ball thread nut, and
the electric cylinder is configured such that,
when load working in the axial direction on the thread rod is less than a predetermined value, a thread ridge of the non-ball thread nut and a thread ridge of the thread rod are separated and are out of contact with each other so that the thread rod is moved in the axial direction thereof by only the ball thread nut, and
when the load working in the axial direction on the thread rod exceeds the predetermined value, the thread ridge of the non-ball thread nut and the thread ridge of the thread rod are made in contact with each other so that the thread rod is moved in the axial direction thereof by the non-ball thread nut, and
wherein a width of the thread ridge of the non-ball thread nut is set smaller than a width of the thread groove for the non-ball thread nut of each thread rod so that a state is controllable and exchangeable between a state that the thread ridge of the non-ball thread nut is separated from the thread ridge of each thread rod and a state that they are in contact with each other.

2. The electric cylinder of claim 1, further comprising:
a mating clutch for connecting the ball thread nut and the non-ball thread nut so that the ball thread nut is moved in the axial direction with respect to the non-ball thread nut while one of the ball thread nut and the non-ball thread nut rotates in synchronization with rotation of the other.

3. The electric cylinder of claim 1, further comprising:
a servo mechanism for controlling and exchanging the state between the state that the thread ridge of the non-ball thread nut is separated from the thread ridge of each thread rod and the state that they are in contact with each other, the servo mechanism including:
a main servo motor for rotating the ball thread nut;
a sub-servo motor for rotating the non-ball thread nut;
a servo amplifier for performing speed control with respect to the main servo motor that rotates the ball thread nut; and
another servo amplifier which receives a signal from the main servo motor to allow the sub-servo motor to follow the main servo motor and which performs position control so that the sub-servo motor is displaced with respect to the main servo motor according to load of the main servo motor and so that the displacement of the sub-servo motor with respect to the main servo motor is withdrawn according to the load of the sub servo motor.

4. The electric cylinder of any one of claim 1,
wherein the ball thread nut is supported in a main body by means of a sleeve urged in the axial direction by a spring movably in the axial direction together with each thread rod according to load in the axial direction working on the ball thread nut, and
the non-ball thread nut is supported and fixed in the axial direction in the main body so that the thread ridge of the non-ball thread nut is separated from or in contact with the thread ridge in a rectangular or trapezoidal shape in section of the corresponding thread rod by movement in the axial direction of each thread rod.

5. An electric cylinder comprising:
a first thread nut and a second thread nut, the first thread nut being a ball thread nut in which a thread groove in an arc shape in section is formed, and a non-ball thread nut which is rotatable in synchronization with the ball thread nut and in which a thread groove in a rectangular or trapezoidal shape in section is formed; and
a thread rod as a single-start thread including a ball thread portion in which only a thread groove in an arc shape in section meshed with the ball thread nut trough balls is formed, and a non-ball thread portion in which only a thread groove in a rectangular or trapezoidal shape in section meshed with the non-ball thread portion is formed, the ball thread portion and the non-ball thread portion being formed separately in the axial direction,
wherein the electric cylinder is configured such that,
when load working in the axial direction on the thread rod is less than a predetermined value, a thread ridge of the non-ball thread nut and a thread ridge of the thread rod are separated and are out of contact with each other so that the thread rod is moved in the axial direction thereof by only the ball thread nut, and
when the load working in the axial direction on the thread rod exceeds the predetermined value, the thread ridge of the non-ball thread nut and the thread ridge of the thread rod are made in contact with each other so that the thread rod is moved in the axial direction thereof by the non-ball thread nut, and wherein a width of the thread ridge of the non-ball thread nut is set smaller than a width of the thread groove for the non-ball thread nut of each thread rod so that a state is controllable and exchangeable between a state that the thread ridge of the non-ball thread nut is separated from the thread ridge of each thread rod and a state that they are in contact with each other.

6. The electric cylinder of claim 5, further comprising:

a mating clutch for connecting the ball thread nut and the non-ball thread nut so that the ball thread nut is moved in the axial direction with respect to the non-ball thread nut while one of the ball thread nut and the non-ball thread nut rotates in synchronization with rotation of the other.

7. The electric cylinder of claim 5, further comprising:

a servo mechanism for controlling and exchanging the state between the state that the thread ridge of the non-ball thread nut is separated from the thread ridge of each thread rod and the state that they are in contact with each other, the servo mechanism including:

a main servo motor for rotating the ball thread nut;

a sub-servo motor for rotating the non-ball thread nut;

a servo amplifier for performing speed control with respect to the main servo motor that rotates the ball thread nut; and another servo amplifier which receives a signal from the main servo motor to allow the sub-servo motor to follow the main servo motor and which performs position control so that the sub-servo motor is displaced with respect to the main servo motor according to load of the main servo motor and so that the displacement of the sub-servo motor with respect to the main servo motor is withdrawn according to the load of the sub servo motor.

8. The electric cylinder of any one of claim 5, wherein the ball thread nut is supported in a main body by means of a sleeve urged in the axial direction by a spring movably in the axial direction together with each thread rod according to load in the axial direction working on the ball thread nut, and the non-ball thread nut is supported and fixed in the axial direction in the main body so that the thread ridge of the non-ball thread nut is separated from or in contact with the thread ridge in a rectangular or trapezoidal shape in section of the corresponding thread rod by movement in the axial direction of each thread rod.

* * * * *